Figure 1:
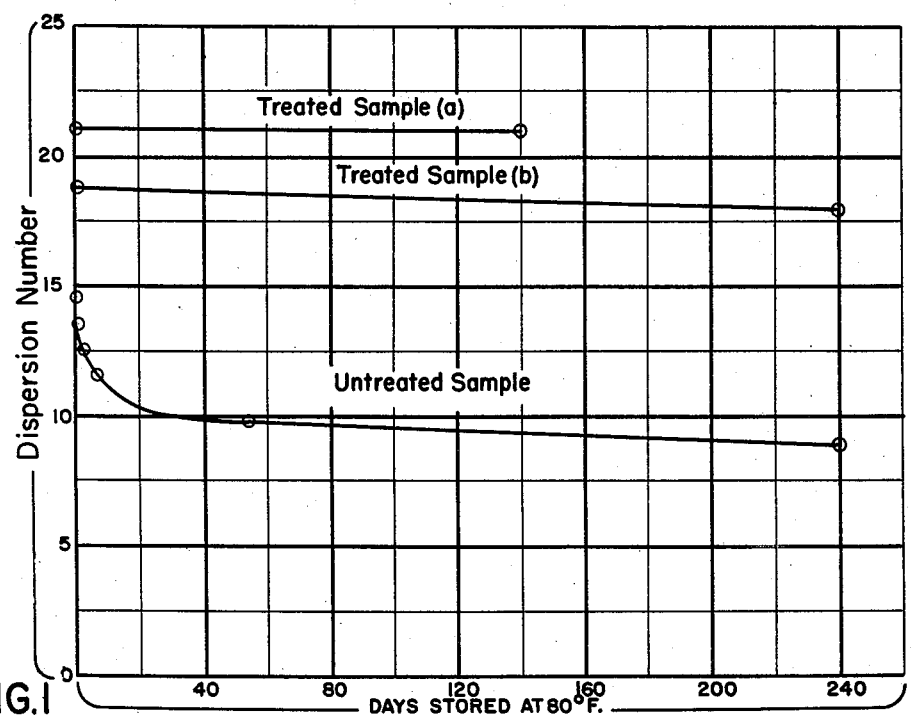

——————— Viscosity
— — — — Dispersion No.
- - - - - - - Settling
— ·· — ·· — Solubility Index (EXAMPLE 1)

INVENTORS:
John G. Kennedy
Elbert R. Spence

ATTORNEY (EXAMPLE 2)

(EXAMPLE 3)

——————— Viscosity
— — — — — Dispersion No.
- - - - - - - Settling
—·—·—·— Solubility Index

*INVENTORS:*
John G. Kennedy
Elbert R. Spence

ATTORNEY

United States Patent Office 2,928,742
Patented Mar. 15, 1960

2,928,742

EASILY RECONSTITUTED MILK POWDER

John G. Kennedy and Elbert R. Spence, Mason, Mich., assignors to American Home Products Corporation, New York, N.Y., a corporation of Delaware Application July 26, 1956, Serial No. 600,255

5 Claims. (Cl. 99—56)

This invention relates to an easily reconstituted milk powder and to a method of preparing it. More particularly it relates to a fat-containing milk powder comprising essential milk ingredients than, on agitation with a suitable amount of water, immediately becomes dispersed in the water to form a smooth, non-settling and stable suspension, said powder retaining its immediate-dispersibility and non-settling properties on extended storage. This powder is prepared by reacting rennet or a similar enzyme with a fat-containing milk product such as whole milk or whole milk compositions or modified or substituted milk compositions dispersed in water under the limited and carefully controlled conditions described below, and then converting the suspension to powdered form.

The use of dry powdered milk, both skim and whole milk, has of course become well established. By the term "fat-containing milk" as opposed to skim milk and as used in this application either as a noun or adjective, we mean both natural whole milk and modified whole milk or whole milk substitutes such as are widely accepted by pediatricians for infant feeding, and similar milk products designed for beverage purposes; one such is disclosed in Bernhart and Hassinen U.S. Patent No. 2,611,706, columns 5 and 6. The fat-containing milk products of this invention contain 35 to 88, preferably 50 to 80, percent non-fat milk solids, including milk proteins, and 12 to 65, preferably 20 to 50, percent fat, dry basis, which may be butterfat or a suitable substitute therefor. The term "non-fat milk solids" is intended to include added carbohydrate such as lactose, dextri-maltose, surcrose, etc., stabilizers, vitamins, minerals, and the like.

One of the difficulties met with in using dry powdered fat-containing milk (as distinguished from dry powdered skim milk), is the tendency of the powder to form clumps or balls which make it difficult to distribute the powder in water to reconstitute the milk. Various expedients have been tried to overcome this difficulty, and have been reasonably successful with skimmed milk powder. However, as far as we know, no expedient has been completely successful in the case of milk powders such as have a substantial fat content and are used in infant feeding or for other beverage or dietetic purposes. The difference appears attributable to the fat content of the milk powder, the fat appearing to co-act with the milk proteins to resist dispersion.

We have discovered that a controlled modification of the properties of the protein in the milk overcomes the difficulty of dispersion. If the casein in the milk powder is too hydrophylic, i.e. too easily soluble, the surface material of the individual particles becomes cementitious and adhesive, and the particles form gluey clumps which retard penetration of water and are consequently slow to disperse. On the other hand, if the casein is insufficiently hydrophylic, i.e. is substantially insoluble in water, the powder disperses readily but also rapidly deposits a sediment which settles on the bottom or sides of the container—a serious disadvantage. Accordingly the desired condition is an intermediate one of reduced controlled hydrophylia which results in a rapidly dispersible powder forming a non-settling suspension.

The principle, therefore, of the invention is to reduce the hydrophylic properties of the milk protein to a point where the surfaces of the dried particles, when wet, do not form a cementitious surface layer which prevents penetration of water, but not to a point where the hydrophylic properties of the protein have been reduced to such a degree that a sediment forms on standing.

It is a surprising fact that while the fat in fat-containing milk powders appears largely responsible for their relatively difficult dispersibility, it is a modification of the protein, i.e. of the casein, which cures this fault.

One of the factors which have been generally considered to bear on the dispersibility of "whole milk powders" is the physical location of the fat in the powder particles. The greater the amount of fat appearing on the surface of the particles (as measured by washing with an anhydrous solvent) the poorer the dispersibility and rate of solution. Our invention is unique in that it approaches the problem through controlled alteration of the protein. Altering the protein is thought to result in a powder in which there is less tendency for the fat to appear on the surface and less tendency for the lactose to crystallize. Such secondary effects are direct results of the enzyme step.

According to our invention we provide a dispersion of fat-containing milk solids in water, preferably at a concentration of about 45 percent solids. This initial dispersion may be whole milk or other liquid milk preparation containing fat or a solid fat-containing milk preparation dispersed in water. We treat the dispersion with a limited amount of rennet, permitting the action of the rennet to reach an end point determined by following the viscosity of the dispersion. We have found that the viscosity of the dispersion first decreases to a small extent and then rises; the desired end point is a point at which the viscosity has returned to or slightly exceeds its original value, e.g. by 10–20 percent. The mix is then rapidly heated to inactivate the enzyme and the dispersion is spray-dried. This will result in a powder having an increased dispersion number without showing undesirable settling or an excessive solubility index.

A suitable product for treating in this way is the product disclosed in the above-mentioned Bernhart et al. Patent 2,611,706 column 5, Table II to column 6, line 29. If this product is in the dried form, it must be dispersed in water before being subjected to the action with rennet. However, if it is available as a liquid concentrate, such redispersion is dispensed with. The composition of this material is as follows:

TABLE I

| | Approximate dry basis, percent |
|---|---|
| Skim cow's milk (9% total solids) | 27.3 |
| Edible lactose (added) | 41.8 |
| Sodium caseinate | 2.6 |
| Fat component+lecithin | 28.2 |
|    Oleo oil (from beef tallow) _____parts__ 50 | |
|    Corn oil _____do____ 30 | |
|    Soybean oil _____do____ 19 | |
|    Lecithin (60% acetone-insol.) _____do____ 1 | |
| Total | 99.9 |

Balance—minerals and vitamins.

The fat component of such compositions is characterized by the facts that it is a blend of food fats at least one of which is of vegetable origin, that it contains only those saturated fatty acids having more than 10 carbon atoms in the molecule, that it contains not over 5 percent $C_{12}$–$C_{14}$ saturated fatty acids, and that it contains at least 50 percent unsaturated fatty acids including a substantial fraction of oleic acid.

Other similar fat-containing milk products such as whole milk, flavored milk beverages, dried cream and low fat milk may also be treated by our process.

While we have indicated that a 45 percent solids content is preferable during the enzyme treatment, this concentration is not critical and may, for example, vary from 5 to 70 percent. Any good commercial rennet extract may be used in our process, for example for 1000 lb. of mix, 5–200 ml., preferably 10–50 ml., of an extract having a strength such that 60 ml. will coagulate 1000 lb. skim milk in 12 hours at 71° F. Alternatively the following enzyme preparations may be used: rennet or rennin in any active form, for example dried rennet or purified rennin, or other milk-coagulating enzymes such as papain and bromelain. Rate of enzyme action may be increased by increasing the temperature or the amount of enzyme or both. During the time in which the mix viscosity is undergoing its decrease and return to the original level the rennet action rate approximately doubles for each 10° C. rise within the active temperature range. Shortly after the time at which the mix has returned to its original viscosity level this reaction rate changes rapidly to about a fifteen fold increase per 10° C. temperature rise.

Rennet treatment must be carried out at a pH in which the rennet is active, preferably in the range pH 6.3 to 6.8. This is the normal pH range for milk products.

The solubility index is an important index of the acceptability of the dried product although not in itself a measure of its value. It is determined by the official method of the American Dry Milk Institute, Inc., 221 North La Salle Street, Chicago 1, Illinois (Bulletin 913 "The Grading of Dry Whole Milk and Sanitary and Quality Standards, Including Standard Methods of Analysis"). It should be noted that the "solubility" of the milk product is inversely proportional to the numerical value obtained by this method, since this index is a measure of undissolved residue under the conditions of the test.

The fundamental criteria for a successful product according to our invention are the dispersion number and the settling rate determined as disclosed below.

Products according to our invention should have a solubility index in the range 0 to 0.5, preferably 0 to 0.1; a dispersion number in the range 14 to 25, preferably in the range 21 to 25; and should not deposit a volume of sediment greater than 1.0 ml., preferably not greater than 0.1 ml. on standing for 18 hours at 40° F., the volume being determined as described below.

The products of our invention made from fat-containing milk powder as described below have certain additional advantages as compared with the untreated fat-containing milk powder. These are: improved maintenance of dispersibility on storage, less film deposit on containers in which the product is used, and improvement in reconstituted flavor.

Figure 2:
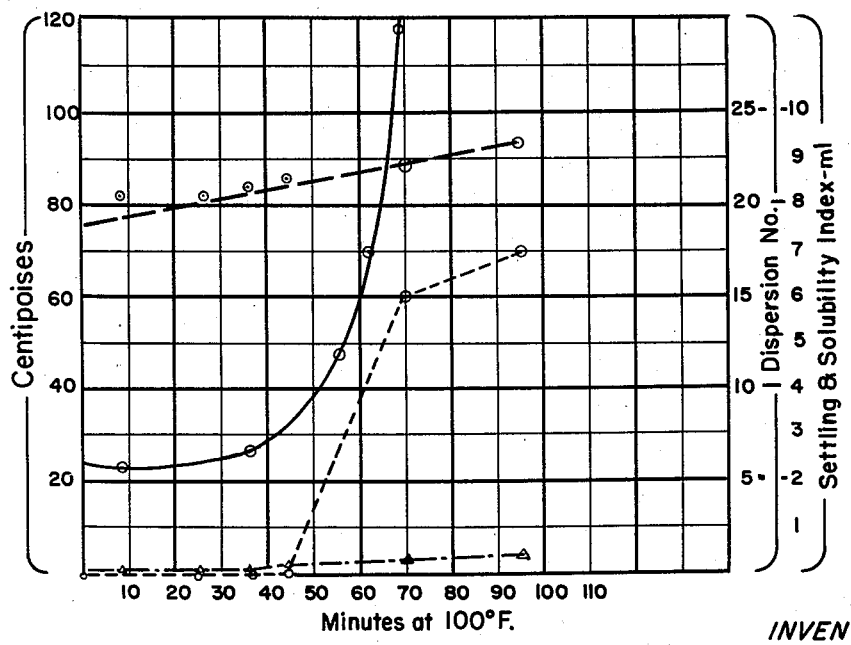
Figure 4:
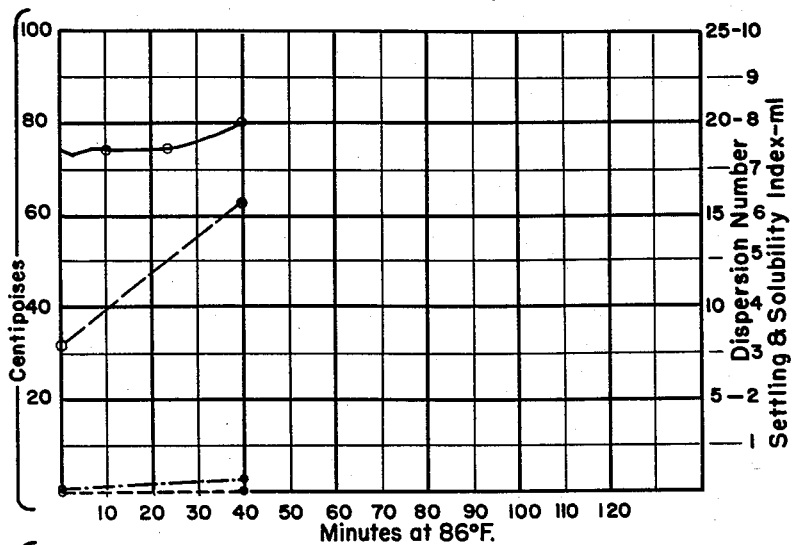
Figure 5:
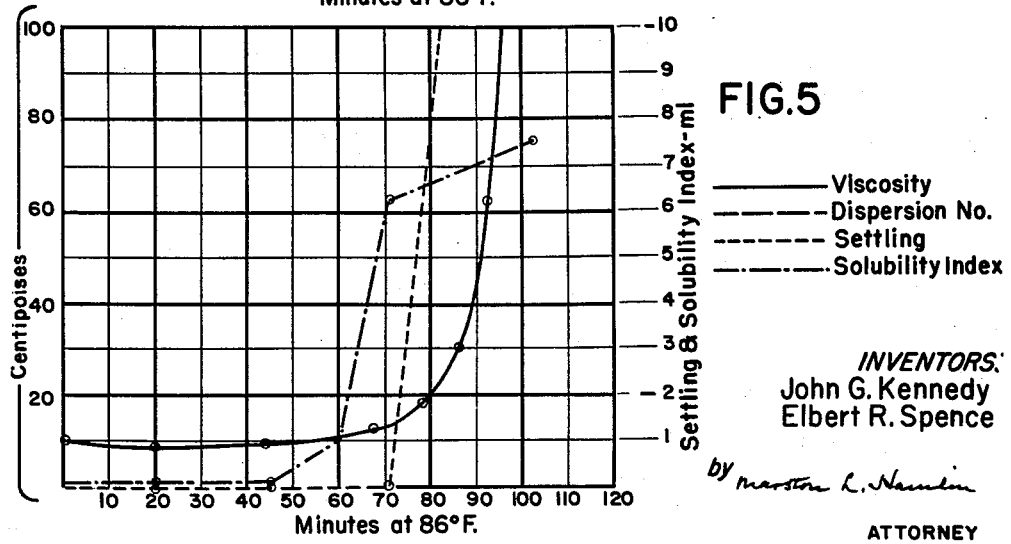

The attached drawings illustrate graphically the results of our invention applied to various milk products. In the drawings:

Fig. 1 represents the dispersion-stability of our product;
Fig. 2 plots the results of Example 1,
Fig. 3 of Example 2 and
Fig. 4 of Example 3;
Fig. 5 represents results obtained with a whole-milk product. The legends on the figures taken with the descriptions below make the drawings self-explanatory without numerical indicia.

Tests of the maintenance of dispersibility under accelerated storage conditions of a treated and untreated product gave the following results. The samples were vacuum-packed in glass and stored in the dark at 80° F. for the indicated times.

TABLE II

*Dispersion number*

|  | Days on test | | | |
|---|---|---|---|---|
|  | 0 | 55 | 140 | 240 |
| Untreated sample [1] | 14.5 | 9.9 | ------ | 9.2 |
| Samples treated [2] according to this invention: | | | | |
| Sample (a) | 21.0 | ------ | 21.0 | ------ |
| Sample (b) | 18.7 | ------ | ------ | 18.0 |

[1] Average determinations on 5 different production lots.
[2] Single lots.

In Fig. 1 of the accompanying drawings these results are plotted graphically, the abscissae denoting the days of storage and the ordinates the dispersion number.

For the better understanding of our invention we give the following examples of its practice, but these are intended to be illustrative only and not to limit the scope of our invention which is defined in the appended claims.

EXAMPLE 1

A 45-percent-solids dispersion in water of 252 lbs. of a milk powder similar to that of Table I is placed in a 30 gallon jacketed tank and warmed to 100° F. Rennet extract, 7.4 ml. diluted to 74 ml. with cold water, is slowly added to the mix with gentle stirring. The mixture is then maintained at 100° F. without agitation. Viscosity is determined before addition of the rennet and at one minute intervals thereafter with a Brookfield "Synchro-Lectric" viscometer and the readings plotted immediately on graph paper in centipoises. Two-gallon samples are withdrawn at intervals, heated rapidly (1.8 minutes) to 140° F. to inactivate the rennet and spray-dried. The dispersion number, settling rate and solubility index of the resulting powders are determined.

When the action is stopped after a little more than one-half hour, a satisfactory product is obtained. Further action for 70 minutes results in an unsatisfactory product having too high a settling rate. These results are graphically represented in Fig. 2 and included in the summary following Example 2.

EXAMPLE 2

1000 lbs. of a 45% total solids milk powder dispersion is prepared with the composition shown below:

TABLE III

| | Approximate dry basis, percent |
|---|---|
| Skim cow's milk—solids | 33.3 |
| Edible lactose | 38.7 |
| Fat component ± lecithin | 27.9 |
| Oleo oil _____parts__ 50 | |
| Corn oil _____do____ 30 | |
| Soybean oil _____do____ 19 | |
| Lecithin (60% acetone-insol.) __do__ 1 | |
| Total | 99.9 |

Balance—Minerals and vitamins.

The mix is pasteurized, clarified, homogenized, and cooled. It is then pumped to a tank equipped with a water and/or steam jacket, powerful agitation and a device for injecting steam directly into the mix, and warmed to 86° F. Rennet extract, 20 ml. diluted to 200 ml. with distilled water, is trickled into the mix with gentle agitation. The mixture is maintained at 86° F. without agitation. Viscosity readings are taken as in Example 1.

After 26 minutes the mix is heated, using injected steam and steam in the jacket, to 140° F. in a 2 minute interval, and held at that temperature for 5 minutes. It is cooled to 60° F. for storage. The mix is then spray-dried.

Figure 3:
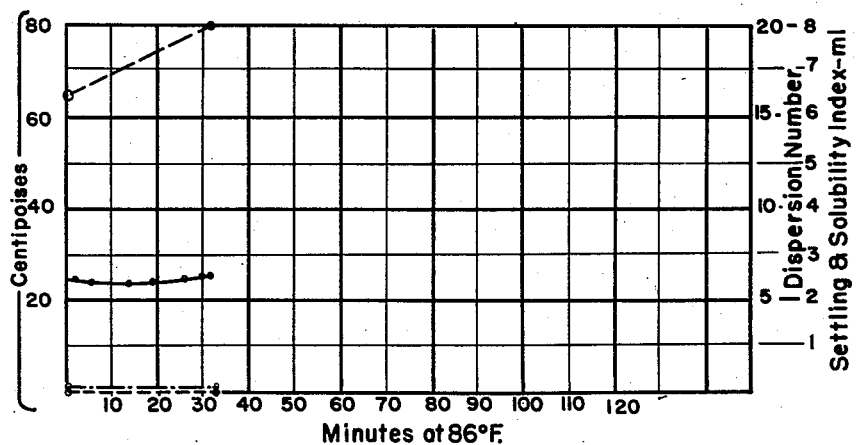

The results are shown graphically in Fig. 3 and the viscosities in centipoises taken at intervals in the operations of Examples 1 and 2 are shown in the following table:

TABLE IV

*Viscosities determined at intervals—centipoises*

| Elapsed Time, Minutes | 0 | 1 | 6 | 8½ | 14 | 18 | 26 | 32 | 36½ | 70 |
|---|---|---|---|---|---|---|---|---|---|---|
| Example 1, 100° F | 25 | | | | 24 | | | | 27 | 140 |
| Example 2, 86° F | 25.1 | 24.9 | 24.8 | | 24.5 | 24.9 | 25.1 | 25.4 | | |

The products after respectively 36½ (Example 1) and 26 (Example 2) minutes of treatment had the desired properties of instant dispersibility and freedom from settling on standing. After 70 minutes the product of Example 1 dispersed readily but settled immediately and was thus unsatisfactory.

The starting materials of Examples 1 and 2 are fat-containing milk powder concentrates of the type described in Table I. These have a fairly good inherent dispersibility which is nevertheless greatly improved by our process.

In the following Example 3 our process is described as applied to a commercial whole milk concentrate. This material has a lower initial dispersibility, which is increased to a marked degree by our process but not to the same level as achieved in Examples 1 and 2.

EXAMPLE 3

Commercial whole milk concentrate is prepared by combining condensed skim milk (30 percent solids) with heavy cream (40 percent butterfat) in the ratio 78.4 percent milk to 21.6 percent cream. The mixture is condensed to 45 percent solids under 29–30 inches vacuum at 70°–75° F. To 36 lb. of the resulting condensed whole milk is added 0.72 ml. rennet extract diluted to 7.2 ml. with cold water, the mixture held at 86° F., heated to 140° F. and spray-dried; determinations are made as described in Example 1. The results are plotted graphically in Fig. 4 and the viscosity readings are shown in the following table:

TABLE V

*Viscosities determined at intervals—centipoises*

| Elapsed time, Minutes | 0 | 3 | 15 | 40 |
|---|---|---|---|---|
| Example 3, 86° F | 74 | 73.5 | 74.5 | 80 |

When the action was stopped after 40 minutes a satisfactory product was obtained as shown graphically in the figure.

The following Table VI summarizes the dispersion number, settling and solubility index for products treated for various periods of time in Examples 1, 2 and 3:

TABLE VI

*Test data on spray-dried samples removed at the indicated elapsed times*

|  | Elapsed Time, Minutes | Dispersion No. | Settling per 100 ml., ml. | Solubility Index, ml. |
|---|---|---|---|---|
| Example 1 | 0 | 18.9 | 0 | 0.1 |
|  | 8½ | 20.5 | 0 | 0.1 |
|  | 36½ | 21.0 | 0 | 0.1 |
|  | 70 | 22.2 | 6.0 | 0.3 |
| Example 2 | 0 | 16.1 | 0 | 0.1 |
|  | 32 | 19.9 | 0 | 0.1 |
| Example 3 | 0 | 8.0 | 0 | 0.1 |
|  | 40 | 15.7 | 0 | 0.25 |

In the examples, the commercial rennet extract had a potency as described in column 3, lines 7 to 27.

Discussion of Examples 1, 2 and 3

A comparison of the dispersion numbers and solubility indices of treated and untreated materials of the type described in Table I may be had from Table VI, Examples 1 and 2. It will be seen that our process raised the dispersion number substantially in a treatment of approximately one-half hour without any increase in settling. The dispersion numbers reached represent practically instantaneous distribution of the powder when shaken with the appropriate amount of water to make the desired beverage—e.g. 3.5 av. oz. powder with 23.5 fl. oz. water—and there was no settling. In this treatment the viscosity of the treated mixtures (Table IV) fell and rose to or slightly above its original value; if (Example 1 and Fig. 2) the treatment was extended to 70 minutes, the viscosity rose to a high value, 140 centipoises. The corresponding change in the product is shown in Table VI, the dispersion number remaining satisfactory, but the settling increasing to the undesirably high figure of 6 ml. Both the products treated in Examples 1 and 2 were milk preparations containing added lactose and about 30 percent of a non-milk fat blend.

If our process is applied to a whole-milk product such as the commercial whole milk concentrate of Example 3, an even greater relative increase in dispersibility is achieved without increase of settling. Since, however, the original inherent dispersibility of such whole-milk products is less than that of the starting products of Examples 1 and 2, the final improved dispersibility achieved may not be as high. In the case of whole-milk product treatment especially, the viscosity may advantageously be carried somewhat beyond its original value as may be seen from Tables V and VI, Example 3.

The results of treatment of whole milk according to this invention are plotted graphically in Fig. 5. This was a mixture of low viscosity. It will be seen that when the mixture was treated for 71 minutes at 86° F., both the viscosity and the settling curves trended sharply upwards; at this danger point for the process the viscosity had risen from an initial 10 cps. to 14 cps., or 40 percent. However, the sample taken at 65 minutes, when the viscosity had risen to 12 cps. or 20 percent, showed no increase in settling and was satisfactory. This represented a suitable end point for this mixture.

In general it will be seen from the drawings that at some point after return of the viscosity to its original value, the curves take a sharp trend upward. This point varies somewhat with different products but is found where the viscosity in centipoises is about 20 percent or more higher than the original viscosity; beyond this point the properties of the treated products tend to deteriorate. While the dispersion number remains advantageously high, the settling increases beyond an acceptable point owing to the increased insolubility of the casein in the material.

Analytical methods

The analytical methods used in assaying the products of our invention are the following. They are either methods recognized in the industry or modifications of such methods adapted to our particular products.

*Solubility index:* (Based on "The Grading of Dry Whole Milk and Sanitary and Quality Standards, Including Standard Methods of Analysis," Bulletin 913, American Dry Milk Institute, Inc., Chicago, Ill., 2nd revised edition, 1947.)

Add 13 g. sample to 100 ml. distilled water at a temperature of 24° C. in the special mixing jar. Place the jar in the mixer and stir for exactly 90 seconds. Allow the sample to stand until the foam has separated sufficiently to permit its complete removal by a spoon. The period of standing after mixing should not exceed 15 minutes. After removal of the foam, mix the sample thoroughly with a spoon for 5 seconds and immediately fill the conical tube to the 50 ml. mark.

Centrifuge the tube 5 minutes at speeds shown below. Immediately siphon off the supernatant liquid to within 2 ml. of the surface of the sediment level, using care not to disturb the sediment layer. Add about 25 ml. distilled water at a temperature of 24° C. and shake the tube to disperse the sediment, dislodging it, if necessary, with a wire. Fill the tube to the 50 ml. mark with distilled water at a temperature of 24° C., invert and shake to mix the contents thoroughly. Again centrifuge for 5 minutes.

Read the sediment in ml. in graduated tube.

The required r.p.m. of the centrifuge varies according to the diameter of the wheel as follows:

```
10 inch diameter=1074 r.p.m.   18 inch diameter=800 r.p.m.
12 inch diameter= 980 r.p.m.   20 inch diameter=759 r.p.m.
14 inch diameter= 909 r.p.m.   22 inch diameter=724 r.p.m.
16 inch diameter= 848 r.p.m.   24 inch diameter=695 r.p.m.
```

The "diameter of wheel" is the distance between the inside bottoms of opposite cups measured through the center of rotation of the centrifuge wheel while the cups are horizontally extended.

*Dispersion number*

EQUIPMENT AND SOLUTIONS (1) A standard 32 fl. oz. "Ball" jar.
(2) A "Ball" cap and ring.
(3) A "Ball" ring with a rubber gasket and with the opening covered with a 20 mesh stainless steel screen.
(4) A frame to hold the "Ball" jar which is pivoted so that it will rotate around a point which coincides with the intersection of the diagonals of the vertical cross section of the jar.
(5) 23.5 fl. oz. of water at 25° C.
(6) 75 mg. of Dow Corning Antifoam AF Emulsion.

METHOD

A. (*Wet Tare*).—One hundred g. of powder are placed in the jar. The antifoam is added to the water which is then poured into the jar. The jar is shaken until the powder is completely reconstituted. The screen top is placed on the jar and the contents drained out, holding the jar at a 60° angle until the steady flow stops. The jar with its screen top and any liquid remaining in the jar is weighed to obtain the wet tare.

B. (*Wet weight*).—The test is carried out in the same manner except that instead of completely reconstituting the powder, the jar is placed in the holding device and turned through 180° and returned 180° every second for 25 seconds. The jar is drained and weighed in the same way to obtain the wet weight.

The dispersion number is calculated by the following equation:

$$\frac{100 - (\text{wet wt.} = \text{wet tare})}{4} = \text{number}$$

The results are averages of six replicates.

*Settling*

12.5 g. of milk powder is placed in a 250 ml. wide mouth Erlenmeyer flask and 87.5 ml. water of 25° C. is added. The flask is stoppered and shaken at once for 30 seconds at the rate of 4 shakes per second. The flask contents are filled into a 100 ml. graduated cylinder which is placed in refrigerated storage at 40° F. for 18 hours. Volume of sediment is recorded in ml.

*Viscosity of mix during processing*

Viscosities are determined with a Brookfield "Synchro-Lectric" Viscometer, model LVO or LVF at 50 r.p.m. using a spindle appropriate to the viscosity range being measured. The spindle is continuously immersed in the mix being treated during the process and readings are taken at one minute intervals. It is helpful to plot readings on a graph so that the trend of the curve can be followed.

From the above it will be seen that we have provided new fat-containing milk powdered compositions having the hitherto unobtainable properties of immediate dispersibility in water and a practically complete absence of settling. We have also devised an economical and practical method of making such concentrates.

We claim:

1. The method of producing a powdered fat-containing milk concentrate that is immediately dispersible in water to form a non-settling suspension which comprises: adding as the sole protein-modifying agent an enzyme effective to insolubilize milk protein and selected from the group consisting of rennin, papain and bromelain to a fluid fat-containing milk composition having a solids content in the range 5 to 70 percent and a fat content in the range 12 to 65 percent, dry basis, maintaining the temperature of the resulting mix in the active temperature range of the enzyme whereby the viscosity of the mix decreases and then increases, stopping the enzyme action by rapidly heating the mix to an enzyme-inactivating temperature when the viscosity has risen from a minimum to at least its original value but not to a point of greatly accelerated increase, and drying the mix to produce a powdered fat-containing milk concentrate.

2. The method defined in claim 1 in which the enzyme action is stopped when the viscosity of the mix expressed in centipoises has risen from a minimum to a point in the range from the original viscosity to 20 percent above the original viscosity.

3. The method defined in claim 2 in which the fluid fat-containing milk composition treated has a solids content of 5 to 70 percent comprising 50 to 80 percent, dry basis, non-fat milk solids including milk proteins and added lactose, and 20 to 50 percent fat dry basis, the fat component being a blend of non-milk food fats at least one of which is of vegetable origin.

4. The method defined in claim 2 in which the fluid fat-containing milk composition treated is a concentrate of natural whole milk.

5. The method of producing a powdered fat-containing milk concentrate that is immediately dispersible in water to form a non-settling suspension which comprises: adding rennet to a fluid milk composition containing 5 to 70 percent solids, said solids comprising 50 to 80 percent, dry basis, non-fat milk solids including milk proteins and lactose, and 20 to 50 percent, dry basis, fat selected from the class consisting (a) of butter fat and (b) of a blend of non-milk food fats including at least one of vegetable origin, the renner being added in an amount effective first to reduce and then to increase the viscosity of the mix expressed in centipoises, heating the mix and holding it at approximately 86° F. until the viscosity of the mix expressed in centipoises after falling to a minimum rises at least to its original value but not more than 20 percent higher, thereupon rapidly heating the mix to approximately 140° F. to stop the enzyme action, and spray-drying it to produce a powdered fat-containing milk concentrate.

(References on following page)

References Cited in the file of this patent

UNITED STATES PATENTS

| | | |
|---|---|---|
| 789,858 | Just | May 16, 1905 |
| 1,258,348 | MacLachlan | Mar. 5, 1918 |
| 1,491,166 | Peebles | Apr. 22, 1924 |
| 2,115,505 | Conquest | Apr. 26, 1938 |

FOREIGN PATENTS

| | | |
|---|---|---|
| 3,531 | Great Britain | 1904 |
| 111,341 | Great Britain | Nov. 16, 1917 |

OTHER REFERENCES

Herrington: Milk and Milk Processing, New York, 1948, p. 71.

UNITED STATES PATENT OFFICE

CERTIFICATE OF CORRECTION

Patent No. 2,928,742                  March 15, 1960

John G. Kennedy et al.

It is hereby certified that error appears in the printed specification of the above numbered patent requiring correction and that the said Letters Patent should read as corrected below.

Column 1, line 18, for "than" read -- that --; line 45, for "surcrose" read -- sucrose --; column 7, line 63, for "100-(wet wt.=wet tare)" read -- 100-(wet wt.-wet tare) --; column 8, line 47, after "fat" insert a comma; line 63, for "renner" read -- rennet --.

Signed and sealed this 30th day of August 1960.

(SEAL)
Attest:

ERNEST W. SWIDER
Attesting Officer

ROBERT C. WATSON
Commissioner of Patents